(12) United States Patent
Ahmed

(10) Patent No.: US 12,478,956 B1
(45) Date of Patent: Nov. 25, 2025

(54) CALCIUM IRON OXIDE/MAGNESIUM OXIDE/CALCIUM OXIDE/CARBON NANOCOMPOSITE MATERIAL

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/262,982

(22) Filed: Jul. 8, 2025

(51) Int. Cl.
| | |
|---|---|
| B01J 23/78 | (2006.01) |
| B01J 20/04 | (2006.01) |
| B01J 20/06 | (2006.01) |
| B01J 20/20 | (2006.01) |
| B01J 20/28 | (2006.01) |
| B01J 20/30 | (2006.01) |
| B01J 21/18 | (2006.01) |
| B01J 23/02 | (2006.01) |
| B01J 35/30 | (2024.01) |
| B01J 35/45 | (2024.01) |
| B01J 35/51 | (2024.01) |
| B01J 37/03 | (2006.01) |
| B01J 37/04 | (2006.01) |
| B01J 37/08 | (2006.01) |
| C02F 1/28 | (2023.01) |
| C02F 101/20 | (2006.01) |

(52) U.S. Cl.
CPC ............ *B01J 23/78* (2013.01); *B01J 20/041* (2013.01); *B01J 20/06* (2013.01); *B01J 20/20* (2013.01); *B01J 20/28007* (2013.01); *B01J 20/3028* (2013.01); *B01J 20/3042* (2013.01); *B01J 20/3078* (2013.01); *B01J 21/18* (2013.01); *B01J 23/02* (2013.01); *B01J 35/394* (2024.01); *B01J 35/45* (2024.01); *B01J 35/51* (2024.01); *B01J 37/036* (2013.01); *B01J 37/04* (2013.01); *B01J 37/084* (2013.01); *B01J 37/088* (2013.01); *C02F 1/288* (2013.01); *C02F 1/281* (2013.01); *C02F 1/283* (2013.01); *C02F 2101/20* (2013.01)

(58) Field of Classification Search
None
See application file for complete search history.

(56) References Cited

U.S. PATENT DOCUMENTS

2023/0117352 A1    4/2023    Zhang et al.

FOREIGN PATENT DOCUMENTS

| CN | 100345597 C | 10/2007 |
|---|---|---|
| CN | 102173463 A | 9/2011 |
| CN | 113134012 B | 11/2022 |

OTHER PUBLICATIONS

Tawakalitu Abdulrasheed, et al., "Synthesis and Characterization of Novel Calcium Oxide/Calcium Ferrite, CaO/CaFe2O4 Composite Nanocatalyst for Biodiesel Production", ES Materials & Manufacturing, vol. 22, No. 922, Jun. 30, 2023, 15 pages.

*Primary Examiner* — Alexandre F Ferre
(74) *Attorney, Agent, or Firm* — Oblon, McClelland, Maier & Neustadt, L.L.P.

(57) ABSTRACT

A $Ca_2Fe_2O_5$/MgO/CaO/C nanocomposite includes elemental carbon (C), an orthorhombic calcium iron oxide ($Ca_2Fe_2O_5$) crystalline phase, a cubic magnesium oxide (MgO) crystalline phase, and a cubic calcium oxide (CaO) crystalline phase.

20 Claims, 4 Drawing Sheets

CALCIUM IRON OXIDE/MAGNESIUM OXIDE/CALCIUM OXIDE/CARBON NANOCOMPOSITE MATERIAL

BACKGROUND

Technical Field

The present disclosure is directed to a $Ca_2Fe_2O_5$/MgO/CaO/C nanocomposite material, more particularly, to a nanocomposite including carbon (C), calcium iron oxide ($Ca_2Fe_2O_5$), magnesium oxide (MgO), and calcium oxide (CaO).

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

Nanocomposite materials are an emerging class of hybrid systems created by incorporating nanoscale fillers, such as metal oxides, carbon-based materials, or ferrites, into matrices composed of polymers, metals, or ceramics. This integration often leads to superior properties compared to individual components, resulting in enhanced mechanical strength, electrical and thermal conductivity, catalytic efficiency, and magnetic behavior. Owing to these multifunctional characteristics, nanocomposites find broad applications across fields like energy storage, environmental remediation, electronics, sensing technologies, and biomedicine.

Traditionally, synthesis approaches have focused on single-phase or binary nanocomposites, typically involving only two distinct components. While such systems offer improved performance over pure materials, they often lack the advanced functionality, stability, and efficiency demanded by complex real-world applications. Challenges such as weak interfacial bonding, poor dispersion, and limited synergistic interactions between phases constrain their broader utility. To overcome these limitations, recent research has shifted toward multi-component nanocomposites, particularly ternary and quaternary systems. These advanced materials integrate three or more distinct phases within a unified structure, allowing each component to deliver specific functions while interacting synergistically. Ternary nanocomposites, for example, can improve photocatalytic efficiency, charge separation, or structural durability, whereas quaternary systems may combine magnetism, electrical conductivity, photocatalysis, and biocompatibility within a single platform. This multi-functionality makes them especially promising for next-generation technologies such as pollutant degradation, biosensors, energy conversion devices, and multifunctional biomedical tools. However, the synthesis of such complex systems presents challenges, including the need for precise control over phase distribution, crystallinity, and component compatibility. Addressing these issues calls for advanced synthesis techniques such as sol-gel processing, hydrothermal and microwave-assisted methods, or environmentally friendly synthesis routes. These strategies enable the scalable and reproducible production of tailored nanocomposites with high performance and multifunctionality. In this way, moving beyond binary systems toward engineered multi-component nanocomposites holds great potential for creating highly efficient materials suited to advanced and interdisciplinary applications.

Different nanocomposite synthesis methods—such as sol-gel, hydrothermal, co-precipitation, and electrochemical techniques—each have specific limitations. The sol-gel method, while offering fine control over composition, often suffers from long processing times and high costs. Hydrothermal synthesis allows for controlled crystallinity and morphology but requires high temperature and pressure, making it less energy-efficient. Co-precipitation is simple and cost-effective, yet it may result in poor particle size control and agglomeration. Electrochemical methods offer precision but are limited by scalability and often require expensive equipment. These limitations can affect the reproducibility, scalability, and overall applicability of the synthesized nanocomposites.

Although a few multicomponent nanocomposite-based materials have been developed in the past, there still exists a need to develop nanocomposites with improved properties. Accordingly, it is one object of the present disclosure to provide a multicomponent nanocomposite by integrating metal ferrites, oxides, and carbon nanomaterials to enhance the properties and their synergistic effect, making them ideal for applications in remove toxic contaminants in aquatic environments.

Each of the aforementioned synthesis methods suffers from one or more drawbacks hindering their adoption. Accordingly, it is one object of the present disclosure to provide a synthesis method and system that may circumvent the drawbacks, such as complexity, high cost, lack of multi-phase integration and nanoscale precision, of the materials known in the art.

SUMMARY

In an exemplary embodiment, a $Ca_2Fe_2O_5$/MgO/CaO/C nanocomposite is described. The $Ca_2Fe_2O_5$/MgO/CaO/C nanocomposite material may include elemental carbon (C), an orthorhombic calcium iron oxide ($Ca_2Fe_2O_5$) crystalline phase, a cubic magnesium oxide (MgO) crystalline phase, and a cubic calcium oxide (CaO) crystalline phase. The $Ca_2Fe_2O_5$/MgO/CaO/C nanocomposite may have an atomic concentration of carbon (C), oxygen (O), magnesium (Mg), calcium (Ca) and iron (Fe) at a certain range.

In some embodiments, the $Ca_2Fe_2O_5$/MgO/CaO/C nanocomposite may have an atomic concentration of carbon (C), oxygen (O), magnesium (Mg), calcium (Ca) and iron (Fe) at a narrower range.

In some embodiments, the $Ca_2Fe_2O_5$/MgO/CaO/C nanocomposite may have a certain average crystallite size at a nanometer scale In some embodiments, the $Ca_2Fe_2O_5$/MgO/CaO/C nanocomposite may have a certain average crystallite size at a nanometer scale at a narrower range.

In some embodiments, the $Ca_2Fe_2O_5$/MgO/CaO/C nanocomposite may have a plurality of irregularly shaped agglomerates.

In some embodiments, the $Ca_2Fe_2O_5$/MgO/CaO/C nanocomposite may have a plurality of spherical nanostructures.

In some embodiments, the $Ca_2Fe_2O_5$/MgO/CaO/C nanocomposite may have a plurality of interconnected structures.

In another exemplary embodiment, a method for preparing the nanocomposite material is described. The method may include forming an aqueous mixture by mixing a first aqueous solution of a chelating agent with a second aqueous solution including a Fe salt, a Mg salt, and a Ca salt. The method may further include adding a glycol into the aqueous mixture to form a gel, heating the gel at an elevated temperature for a sufficient duration to form a dry powder. The method may further include calcining the dry powder at an elevated temperature to form the $Ca_2Fe_2O_5/MgO/CaO/C$ nanocomposite.

In some embodiments, the first aqueous solution may be added into the second aqueous solution under continuous stirring for a certain period of time.

In some embodiments, the Fe salt may be selected from the group consisting of iron sulfate ($Fe_2(SO_4)_3$), iron nitrate ($Fe(NO_3)_3$), iron chloride ($FeCl_3$) and iron acetate ($Fe(CH_3COO)_3$), the Mg salt may be selected from the group consisting of magnesium sulfate ($MgSO_4$), magnesium nitrate ($Mg(NO_3)_2$), magnesium chloride ($FeCl_2$) and magnesium acetate ($Mg(CH_3COO)_2$), and the Ca salt may be selected from the group consisting of calcium sulfate ($CaSO_4$), calcium nitrate ($Ca(NO_3)_2$), calcium chloride ($CaCl_2$)) and calcium acetate ($Ca(CH_3COO)_2$).

In some embodiments, the Fe salt may be iron nitrate ($Fe(NO_3)_3$), the Mg salt may be magnesium nitrate ($Mg(NO_3)_2$), and the Cd salt may be calcium nitrate ($Ca(NO_3)_2$).

In some embodiments, the chelating agent may be at least one hydroxyalkyl carboxylic acid selected from the group consisting of citric acid, tartaric acid, malic acid, mandelic acid and 12-hydroxystearic acid.

In some embodiments, the chelating agent may be tartaric acid.

In some embodiments, the glycol may be introduced under continuous stirring into the aqueous mixture.

In some embodiments, the glycol may have a certain number average molecular weight ($M_n$).

In some embodiments, the glycol may be selected from the group consisting of polyethylene glycol 200, polyethylene glycol 400, polyethylene glycol 4000, polypropylene glycol 200, and mixtures thereof.

In some embodiments, the glycol may be polyethylene glycol 400.

In some embodiments, the tartaric acid and the polyethylene glycol 400 may decompose during calcination.

In some embodiments, the calcination of the tartaric acid may yield a residue with the element carbon in the $Ca_2Fe_2O_5/MgO/CaO/C$ nanocomposite.

In some embodiments, the calcination of the polyethylene glycol 400 may yield a residue with the element carbon in the $Ca_2Fe_2O_5/MgO/CaO/C$ nanocomposite.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
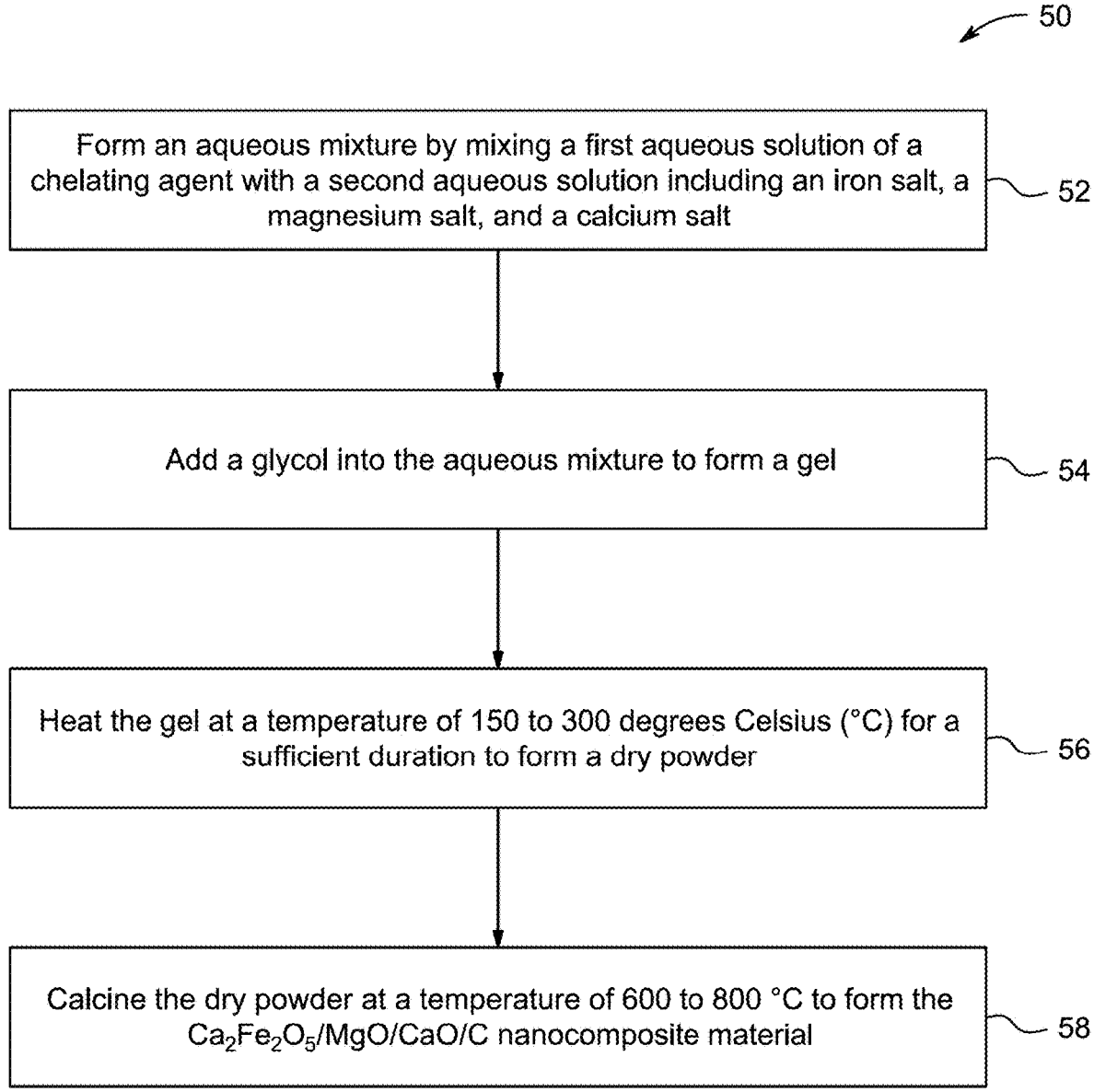
FIG. 1A is a schematic diagram of a flow chart of a method of manufacturing a $Ca_2Fe_2O_5/MgO/CaO/C$ nanocomposite, according to certain embodiments.

Embodiments of the present invention will now be described fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise. In the drawings, like reference numerals designate identical or corresponding parts throughout the several views. Further, as used herein, the words 'a', 'an', and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

As used herein, the term 'room temperature' refers to a temperature range of '25 degrees Celsius (° C.)±3° C. in the present disclosure.

As used herein, the term 'nanomaterial' refers to materials with structural features at the nanoscale (1-100 nanometers (nm)) that exhibit unique physical, chemical, and mechanical properties compared to their bulk counterparts.

As used herein, the term 'carbon nanomaterials (CNMs)' refers to a class of nanostructured materials composed primarily of carbon atoms, exhibiting exceptional mechanical, electrical, thermal, and chemical properties.

As used herein, the term 'nanocomposite' refers to a composite material that has at least one component with a grain size measured in nanometers.

As used herein, the term 'crystallite' refers to a tiny or even microscopic crystal that is formed during the cooling of many materials.

As used herein, the term 'crystallite size' refers to the average size of a crystal domain within a material.

As used herein the term 'average crystallite size' refers to the average size of the individual crystallites (small crystalline regions) that make up a polycrystalline material.

As used herein the term 'mean particle size' refers to the average size of particles in a given sample. It represents the typical diameter or size of the individual particles in a powder, suspension, or colloidal system.

As used herein, the term 'chelating agent' is a molecule that binds to a metal ion through multiple coordination sites, forming a stable ring-like complex. It helps in stabilizing metal ions and preventing their precipitation or unwanted reactions.

As used herein, the term 'amount' refers to the proportion, or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

An atomic percent of a component, unless specifically stated to the contrary, is based on the total number of atoms in the formulation or composition in which the component is included. For example, if a particular element or component in a composition or article is said to have 5 at. %, it is understood that this percentage represents the proportion of that element relative to a total atomic composition of 100 at. %.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopes of naturally occurring magnesium include $^{24}Mg$, $^{25}Mg$, and $^{26}Mg$. Isotopes of naturally occurring iron include $^{54}Fe$, $^{56}Fe$, $^{57}Fe$, and $^{58}Fe$. Isotopes of Ca include $^{40}Ca$, $^{42}Ca$, $^{43}Ca$, $^{44}Ca$, and $^{46}Ca$. Isotopically labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of this disclosure are directed to a $Ca_2Fe_2O_5$/MgO/CaO/C nanocomposite using the Pechini sol-gel method. The successful integration of elemental carbon (C) and distinct phases of calcium iron oxide ($Ca_2Fe_2O_5$), magnesium oxide (MgO), and calcium oxide (CaO) to form a multicomponent nanocomposite. Their synergistic effect makes them ideal for energy storage, catalysis, biomedicine, and environmental sustainability applications.

According to a first aspect of the present disclosure, a $Ca_2Fe_2O_5$/MgO/CaO/C nanocomposite (a nanocomposite) is described. In some embodiments, the nanocomposite may include crystalline phases, but is not limited to Quartz, Calcite, Hematite, Magnetite, Goethite, Dolomite, Albite, Anorthite, Pyrite, Fluorite, Halite, Barite, Apatite, Rutile, and Zircon. In a preferred embodiment, the nanocomposite as determined by X-ray diffraction includes elemental C, an orthorhombic $Ca_2Fe_2O_5$ crystalline phase, a cubic MgO crystalline phase, and a cubic CaO crystalline phase. In some embodiments, elemental C may exist in amorphous or crystalline form. In some embodiments, $Ca_2Fe_2O_5$ has an orthorhombic phase. In some embodiments, the $Ca_2Fe_2O_5$ may exist in other phases, including tetragonal and cubic. In some embodiments, MgO has a cubic phase. In some embodiments, the MgO may exist in other phases, including hexagonal and tetragonal. In some embodiments, CaO has a cubic phase. In some embodiments, CaO may exist in other phases, including tetragonal and orthorhombic.

In some embodiments, the atomic concentration of C ranges from 1 to 5 atomic percent (at. %), preferably 2 to 5 at. %, preferably 3 to 5 at. %, and preferably 4 to 5 at. %, preferably 2 to 5 at. %, preferably 3 to 5 at. %, and preferably 4 to 5 at. %, the atomic concentration of oxygen (O) is from 50 to 75 at. %, preferably 55 to 75 at. %, preferably 60 to 75 at. %, preferably 65 to 75 at. %, preferably 70 to 75 at. %, preferably 50 to 65 at. %, the atomic concentration of magnesium (Mg) is from 10 to 35 at. %, preferably 11 to 34 at. %, preferably 12 to 33 at. %, preferably 13 to 32 at. %, preferably 14 to 31 at. %, preferably 15 to 30 at. %, preferably 16 to 29 at. %, and preferably 17 to 28 at. %, preferably 10 to 25 at. %, preferably 11 to 24 at. %, preferably 12 to 23 at. %, preferably 13 to 22 at. %, preferably 14 to 21 at. %, preferably 15 to 20 at. %, preferably 16 to 19 at. %, and preferably 17 to 18 at. %, the atomic concentration of calcium (Ca) is from 10 to 35 at. %, preferably 11 to 34 at. %, preferably 12 to 33 at. %, preferably 13 to 32 at. %, preferably 14 to 31 at. %, preferably 15 to 30 at. %, preferably 16 to 29 at. %, and preferably 17 to 28 at. %, preferably 10 to 25 at. %, preferably 11 to 24 at. %, preferably 12 to 23 at. %, preferably 13 to 22 at. %, preferably 14 to 21 at. %, preferably 15 to 20 at. %, preferably 16 to 19 at. %, and preferably 17 to 18 at. %, and the atomic concentration of iron (Fe) is from 5 to 15 at. %, preferably 6 to 14 at. %, preferably 7 to 13 at. %, preferably 8 to 12 at. %, and preferably 9 to 11 at. %, preferably 8 to 15 at. %, preferably 8.5 to 14.5 at. %, preferably 9.0 to 14.0 at. %, preferably 9.5 to 13.5 at. %, preferably 10.0 to 13.0 at. %, and preferably 10.5 to 12.5 at. %, each based on the total number of atoms in the nanocomposite, as confirmed by energy-dispersive X-ray. In a preferred embodiment, the atomic concentration of C is 4.9 at. %, the atomic concentration of O is 49.9 at. %, the atomic concentration of Mg is 17.2 at. %, the atomic concentration of Ca is 17.4 at. %, and the atomic concentration of Fe is from 10.6 at. %.

In some embodiments, the $Ca_2Fe_2O_5$/MgO/CaO/C nanocomposite has an average crystallite size ranging from 50 to 75 nanometers (nm), preferably 50.5 to 74.5 nm, preferably 51.0 to 74.0 nm, preferably 51.5 to 73.5 nm, preferably 52.0 to 73.0 nm, preferably 52.5 to 72.5 nm, and preferably 53.0 to 72.0 nm, preferably 50 to 65 nm, preferably 50.2 to 64.8 nm, preferably 50.4 to 64.6 nm, preferably 50.6 to 64.4 nm, preferably 50.8 to 64.2 nm, preferably 51.0 to 64.0 nm, preferably 51.2 to 63.8 nm, preferably 51.4 to 63.6 nm, preferably 51.6 to 63.4 nm, preferably 51.8 to 63.2 nm, preferably 52.0 to 63.0 nm, preferably 52.2 to 62.8 nm, preferably 52.4 to 62.6 nm, preferably 52.6 to 62.4 nm, preferably 52.8 to 62.2 nm, and preferably 53.0 to 62.0 nm. In a preferred embodiment, the $Ca_2Fe_2O_5$/MgO/CaO/C nanocomposite has an average crystallite size of 53.09 nm.

In some embodiments, the nanocomposite consists essentially of sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nanourchins, nanoflowers, nanostars, tetrapods, and their mixtures thereof are also possible. In a preferred embodiment, the $Ca_2Fe_2O_5$/MgO/CaO/C nanocomposite material has a plurality of irregularly shaped agglomerates. In some embodiments, irregularly shaped agglomerates include flake-like agglomerates, clustered agglomerates, chain-like agglomerates, globular agglomerates, sponge-like or porous agglomerates, dendritic agglomerates, fused or sintered agglomerates, and platelet or sheet agglomerates. In a preferred embodiment, the $Ca_2Fe_2O_5$/MgO/CaO/C nanocomposite has clustered agglomerates. In a preferred embodiment, the $Ca_2Fe_2O_5$/MgO/CaO/C nanocomposite has a plurality of spherical nanostructures. In some embodiments, spherical nanostructures include nanospheres, core-shell nanospheres, hollow nanospheres, quantum dots, and polymeric nanospheres. In a preferred embodiment, the $Ca_2Fe_2O_5/MgO/CaO/C$ nanocomposite material has a plurality of interconnected structures. In some embodiments, spherical aggregates with porous connections include clusters of spheres connected by pores or voids. These pores can be classified based on their size into micropores (<2 nm), mesopores (2-50 nm), and macropores (>50 nm). The pores are not isolated but form a continuous, interconnected structure throughout the material.

FIG. 1A illustrates a flow chart of a method 50 of preparing the $Ca_2Fe_2O_5/MgO/CaO/C$ nanocomposite is described. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes forming an aqueous mixture by mixing a first aqueous solution of a chelating agent with a second aqueous solution including an iron (Fe) salt, a magnesium (Mg) salt, and a calcium (Ca) salt. In some embodiments, the first aqueous solution is added into the second aqueous solution under continuous stirring for a period of 10 to 40 minutes, preferably 11 to 39 minutes, preferably 12 to 38 minutes, 13 to 37 minutes, 14 to 36 minutes, 15 to 35 minutes, 16 to 34 minutes, 17 to 33 minutes, 18 to 32 minutes, and 19 to 31 minutes. In a preferred embodiment, the first aqueous solution is added into the second aqueous solution under continuous stirring for a period of 30 minutes. In some embodiments, the first solution and the second solution can be mixed by stirring, swirling, sonicating, or a combination thereof may be employed to form the precipitate.

In some embodiments, the Fe salt may include but is not limited to iron chloride, iron sulfate, iron carbonate, iron phosphate, iron acetate, iron citrate, iron lactate, iron gluconate, iron formate, iron oxalate, iron tartrate, iron ascorbate, iron benzoate, iron propionate, iron stearate, iron hydroxide, iron peroxide, iron iodate, iron molybdate, iron hypochlorite, iron thiocyanate, iron chromate, iron bromide, iron fluoride, iron sulfide, iron arsenate, iron tungstate, iron borate, iron perchlorate, and iron hydride. In some embodiments, the Fe salt is at least one selected from the group consisting of iron sulfate ($Fe_2(SO_4)_3$), iron nitrate ($Fe(NO_3)_3$), iron chloride ($FeCl_3$), and iron acetate ($Fe(CH_3COO)_3$). In a preferred embodiment, the Fe salt is $Fe(NO_3)_3$. In some embodiments, the weight ratio of $Fe(NO_3)_3$ in the reaction mixture is in a range from 50 to 70 g/L, preferably 52 to 68 g/L, preferably 54 to 66 g/L, and preferably 56 to 64 g/L. In a preferred embodiment, the concentration of $Fe(NO_3)_3$ in the reaction mixture is 57.14 g/L.

In some embodiments, the Mg salt may include but is not limited to magnesium chloride, magnesium sulfate, magnesium carbonate, magnesium phosphate, magnesium acetate, magnesium citrate, magnesium lactate, magnesium gluconate, magnesium formate, magnesium oxalate, magnesium tartrate, magnesium ascorbate, magnesium benzoate, magnesium propionate, magnesium stearate, magnesium hydroxide, magnesium peroxide, magnesium iodate, magnesium molybdate, magnesium hypochlorite, magnesium thiocyanate, magnesium chromate, magnesium ferrite, magnesium bromide, magnesium fluoride, magnesium sulfide, magnesium arsenate, magnesium tungstate, magnesium borate, magnesium perchlorate, and magnesium hydride. In some embodiments, the Mg salt is at least one selected from the group consisting of magnesium sulfate ($MgSO_4$), magnesium nitrate ($Mg(NO_3)_2$), magnesium chloride ($FeCl_2$) and magnesium acetate ($Mg(CH_3COO)_2$). In a preferred embodiment, the Mg salt is $Mg(NO_3)_2$. In some embodiments, the weight ratio of $Mg(NO_3)_2$ in the reaction mixture is in a range from 50 to 70 g/L, preferably 52 to 68 g/L, preferably 54 to 66 g/L, and preferably 56 to 64 g/L. In a preferred embodiment, the concentration of $Mg(NO_3)_2$ in the reaction mixture is 57.14 g/L.

In some embodiments, the calcium salt may include but is not limited to calcium chloride, calcium sulfate, calcium carbonate, calcium phosphate, calcium acetate, calcium citrate, calcium lactate, calcium gluconate, calcium formate, calcium oxalate, calcium tartrate, calcium ascorbate, calcium benzoate, calcium propionate, calcium stearate, calcium hydroxide, calcium peroxide, calcium iodate, calcium molybdate, calcium hypochlorite, calcium thiocyanate, calcium chromate, calcium ferrite, calcium bromide, calcium fluoride, calcium sulfide, calcium arsenate, calcium tungstate, calcium borate, calcium perchlorate, and calcium hydride. In some embodiments, the calcium salt is at least one selected from the group consisting of calcium sulfate ($CaSO_4$), calcium nitrate ($Ca(NO_3)_2$), calcium chloride ($CaCl_2$)), and calcium acetate ($Ca(CH_3COO)_2$). In a preferred embodiment, calcium salt is $Ca(NO_3)_2$. In some embodiments, the weight ratio of $Ca(NO_3)_2$ in the reaction mixture is in a range from 50 to 70 g/L, preferably 52 to 68 g/L, preferably 54 to 66 g/L, and preferably 56 to 64 g/L. In a preferred embodiment, the concentration of $Ca(NO_3)_2$ in the reaction mixture is 57.14 g/L.

In some embodiments, the chelating agent includes at least one hydroxyalkyl carboxylic acid selected from the group consisting of citric acid, tartaric acid, malic acid, mandelic acid and 12-hydroxystearic acid. In some embodiments, tartaric acid includes natural and commercial forms of the acid. In some embodiments, tartaric acid is D-tartaric acid, L-tartaric acid, achiral tartaric acid, or a racemic mixture of D- and L-tartaric acid forms. In a preferred embodiment, the chelating agent is tartaric acid.

In some embodiments, the reaction mixture has a weight ratio of hydroxyalkyl carboxylic acid to a total of the Mg ion, Fe ion, and Ca ion of 0.25:1 to 1:1, preferably 0.30:1 to 0.95:1, preferably 0.35:1 to 0.90:1, preferably 0.40:1 to 0.85:1, and preferably 0.45:1 to 0.80:1. In a preferred embodiment, the reaction mixture has a weight ratio hydroxyalkyl carboxylic acid to a total of the Mg ion, Fe ion, and Ca ion of 0.61:1. In some embodiments, the reaction mixture has a weight ratio of the Mg ion, Fe ion, and Ca ion is 1:1:1.

At step 54, the method 50 includes adding a glycol into the aqueous mixture to form a gel.

In some embodiments, the glycol is introduced under continuous stirring into the aqueous mixture. Continuous stirring of glycol into an aqueous mixture can be achieved using methods like magnetic stirring, mechanical agitators, or recirculation pumps. This ensures uniform distribution and blending of glycol throughout the solution.

In some embodiments, the glycol may include, but is not limited to, ethylene glycol, diethylene glycol, polyethylene glycol, propylene glycol, dipropylene glycol, butylene glycol, hexylene glycol, neopentyl glycol, 1,2-butanediol, 1,3-butanediol, 1,2-pentanediol, 1,5-pentanediol, 2-methyl-1,3-propanediol, 1,6-hexanediol, 2-butene-1,4-diol, 2-ethyl-1,3-hexanediol, 2,3-butanediol, 1,2-hexanediol, 1,3-hexanediol, and caprylyl glycol. In some embodiments, the glycol is selected from the group consisting of polyethylene glycol 200, polyethylene glycol 400, polyethylene glycol 4000, polypropylene glycol 200, and mixtures thereof. In a preferred embodiment, the glycol is polyethylene glycol 400.

In some embodiments, the glycol has a number average molecular weight ($M_n$) 200 to 5000 grams per mole (g/mol), preferably 210 to 4990 g/mol, preferably 220 to 4980 g/mol, preferably 230 to 4970 g/mol, preferably 240 to 4960 g/mol, preferably 250 to 4950 g/mol, preferably 260 to 4940 g/mol, preferably 270 to 4930 g/mol, preferably 280 to 4920 g/mol, preferably 290 to 4910 g/mol, preferably 300 to 4900 g/mol, preferably 310 to 4890 g/mol, preferably 320 to 4880 g/mol, preferably 330 to 4870 g/mol, preferably 340 to 4860 g/mol, preferably 350 to 4850 g/mol, preferably 360 to 4840 g/mol, preferably 370 to 4830 g/mol, preferably 380 to 4820 g/mol, preferably 290 to 4810 g/mol. In a preferred embodiment, the glycol has a molecular weight of 400 g/mol.

At step 56, the method includes heating the gel at a temperature of 150 to 300 degrees Celsius (° C.) preferably 155 to 295° C., preferably 160 to 285° C., preferably 165 to 280° C., preferably 170 to 275° C., preferably 175 to 270° C., preferably 180 to 265° C., preferably 185 to 260° C., and preferably 190 to 255° C. for a sufficient duration to form a dry powder. In a preferred embodiment, the reaction mixture is heated to form a solid intermediate product at a temperature of 250° C. to evaporate the solvents completely. The reaction mixture may be heated using any heating appliances such as ovens, microwaves, autoclaves, hot plates, heating mantles and tapes, oil baths, salt baths, sand baths, air baths, hot-tube furnaces, and hot-air guns.

At step 58, the method includes calcining the dry powder at a temperature of 600 to 800° C., preferably 600 to 780° C., preferably 600 to 760° C., preferably 600 to 740° C., preferably 600 to 720° C., preferably 600 to 700° C., 600 to 680° C., preferably 600 to 660° C., preferably 600 to 640° C., and preferably 600 to 620° C., to form the $Ca_2Fe_2O_5$/MgO/CaO/C nanocomposite material. In a preferred embodiment, calcining the dry powder at a temperature of 600° C. to form the nanocomposite material. The calcination of the powder is carried out by heating it to a high temperature under a restricted supply of ambient oxygen. This is performed to remove impurities or volatile substances and to incur thermal decomposition. The calcination is carried out in a furnace preferably equipped with a temperature control system, which may provide a heating rate of up to 50° C. per minute (° C./min), preferably up to 40° C./min, preferably up to 30° C./min, preferably up to 20° C./min, preferably up to 10° C./min, preferably up to 5° C./min, preferably up to 2° C./min, and preferably up to 1° C./min.

In some embodiments, the tartaric acid and the polyethylene glycol 400 decompose during calcination. Tartaric acid and polyethylene glycol 400 decompose during the calcination process due to their organic nature. Calcination typically involves heating a substance at high temperatures in the presence of air or oxygen, leading to thermal decomposition. During calcination, tartaric acid undergoes thermal decomposition, releasing gases like carbon dioxide ($CO_2$), $H_2O$, carbon-rich residue, or other volatile organic products. Similarly, PEG-400, a low-molecular-weight polymer, undergoes oxidative decomposition that releases gases like carbon monoxide (CO), $CO_2$, water vapor, hydrogen, or carbonates. This decomposition process is crucial to remove organic components and obtain pure nanocomposite material.

In some embodiments, the calcination of the tartaric acid yields a residue with the element carbon in the $Ca_2Fe_2O_5$/MgO/CaO/C nanocomposite. The residue contains elemental carbon, which can remain embedded within the nanocomposite matrix. Elemental carbon can exist in amorphous or crystalline forms. In a preferred embodiment, elemental carbon exists in amorphous form. In some embodiments, elemental carbon may exist in different forms, including fullerene, graphene, graphite, carbon nanotubes, carbon soot, and activated carbon.

The following examples are provided solely for illustration and are not to be construed as limitations of the present disclosure, as many variations thereof are possible without departing from the spirit and scope of the present disclosure.

EXAMPLES

The following examples demonstrate a method of fabricating a $Ca_2Fe_2O_5$/MgO/CaO/C nanocomposite. The examples are provided solely for illustration and are not to be construed as limitations of the present disclosure, as many variations thereof are possible without departing from the spirit and scope of the present disclosure.

Example 1: Synthesis of $Ca_2Fe_2O_5$/MgO/CaO/C Nanocomposite

Figure 1B:
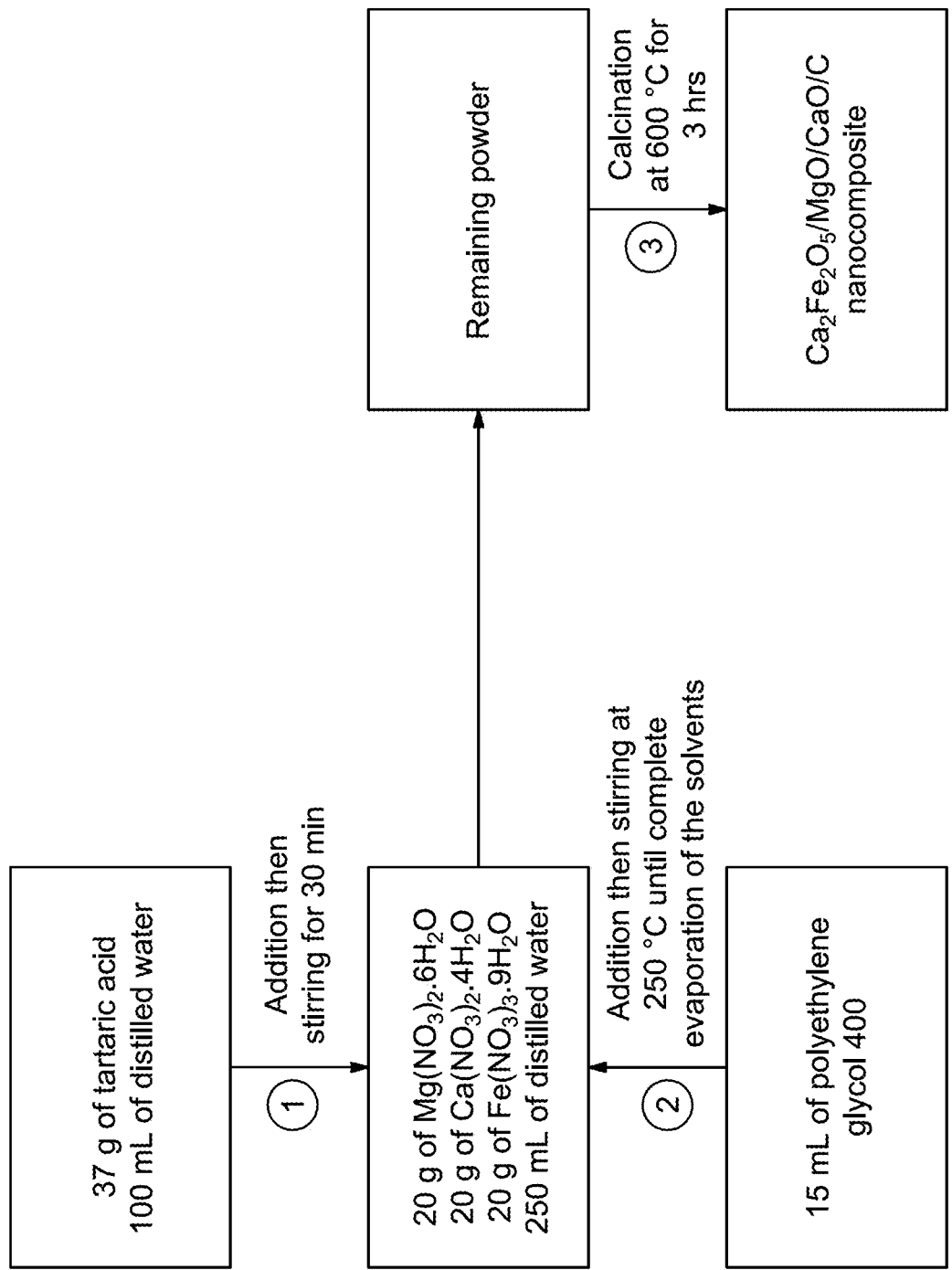
FIG. 1B shows the experimental steps for the synthesis of the $Ca_2Fe_2O_5/MgO/CaO/C$ nanocomposite, according to certain embodiments.

The synthesis of the $Ca_2Fe_2O_5$/MgO/CaO/C nanocomposite was conducted using the Pechini sol-gel method as illustrated in FIG. 1B. Initially, 37 grams (g) of tartaric acid was dissolved in 100 milliliters (mL) of distilled water. In a separate step, 20 g of magnesium nitrate hexahydrate ($Mg(NO_3)_2 \cdot 6H_2O$), 20 g of calcium nitrate tetrahydrate ($Ca(NO_3)_2 \cdot 4H_2O$), and 20 g of $Fe(NO_3)_3 \cdot 9H_2O$ were dissolved in 250 mL of distilled water. The tartaric acid solution was added to the nitrate solution with continuous stirring for 30 minutes. Next, 15 mL of polyethylene glycol 400 was added to the mixture, and the solution was stirred continuously at 250° C. until the solvents completely evaporated. The resulting solid was calcinated at 600° C. for 3 hrs to produce the $Ca_2Fe_2O_5$/MgO/CaO/C nanocomposite.

Figure 2:
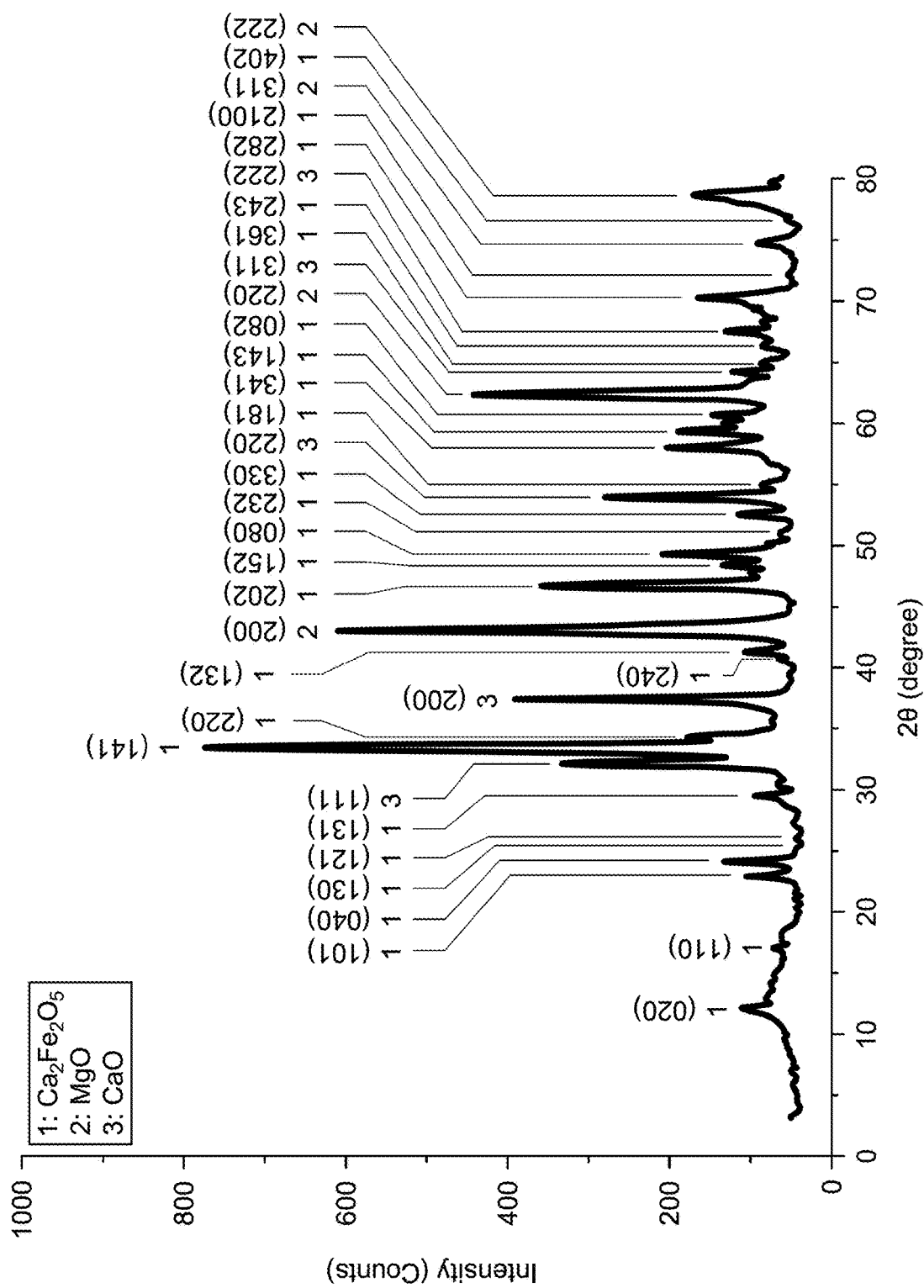
FIG. 2 is a graph depicting an X-ray diffraction (XRD) pattern of the $Ca_2Fe_2O_5/MgO/CaO/C$ nanocomposite, according to certain embodiments.

The structural and crystallographic properties of the synthesized nanocomposite were analyzed using X-ray diffraction (XRD), as shown in FIG. 2, and the corresponding data are summarized in Table 1. The nanocomposite consists of calcium iron oxide ($Ca_2Fe_2O_5$), magnesium oxide (MgO), and calcium oxide (CaO), with their respective card numbers joint committee on powder diffraction standards (JCPDS)-01-089-8662, JCPDS-01-087-0652, and JCPDS-00-004-0777, respectively. The crystal systems of $Ca_2Fe_2O_5$, MgO, and CaO are orthorhombic, cubic, and cubic, respectively. The average crystallite size of the synthesized nanocomposite is 53.09 nanometers (nm). The XRD pattern of $Ca_2Fe_2O_5$ exhibited 2θ angles at 11.95°, 16.89°, 22.98°, 24.13°, 24.97°, 25.81°, 29.38°, 33.36°, 34.19°, 40.49°, 41.24°, 46.69°, 48.37°, 49.21°, 50.78°, 52.46°, 54.88°, 57.91°, 59.28°, 60.43°, 64.95°, 66.32°, 70.19°, 72.08°, and 76.59°, corresponding to the Miller indices (020), (110), (101), (040), (130), (121), (131), (141), (220), (240), (132), (202), (152), (080), (232), (330), (181), (341), (143), (082), (361), (243), (282), (2 10 0), and (402), respectively. For MgO, the XRD pattern showed 2θ angles at 43.11°, 62.44°, 74.60°, and 78.59°, corresponding to the Miller indices (200), (220), (311), and (222), respectively. The XRD pattern of CaO displayed 2θ angles at 32.10°, 37.45°, 53.94°, 64.11°, and 67.47°, corresponding to the Miller indices (111), (200), (220), (311), and (222), respectively.

TABLE 1

Structural and crystallographic properties of the synthesized nanocomposite components as determined by XRD.

| Components of synthesized nanocomposite | | | | Average crystallite size of synthesized nanocomposite |
|---|---|---|---|---|
| Phase | Chemical name | Card No. | Crystal system | (nm) |
| $Ca_2Fe_2O_5$ | Calcium iron oxide | JCPDS-01-089-8662 | Orthorhombic | 53.09 |
| MgO | Magnesium oxide | JCPDS-01-087-0652 | Cubic | |
| CaO | Calcium oxide | JCPDS-00-004-0777 | Cubic | |

Figure 3:
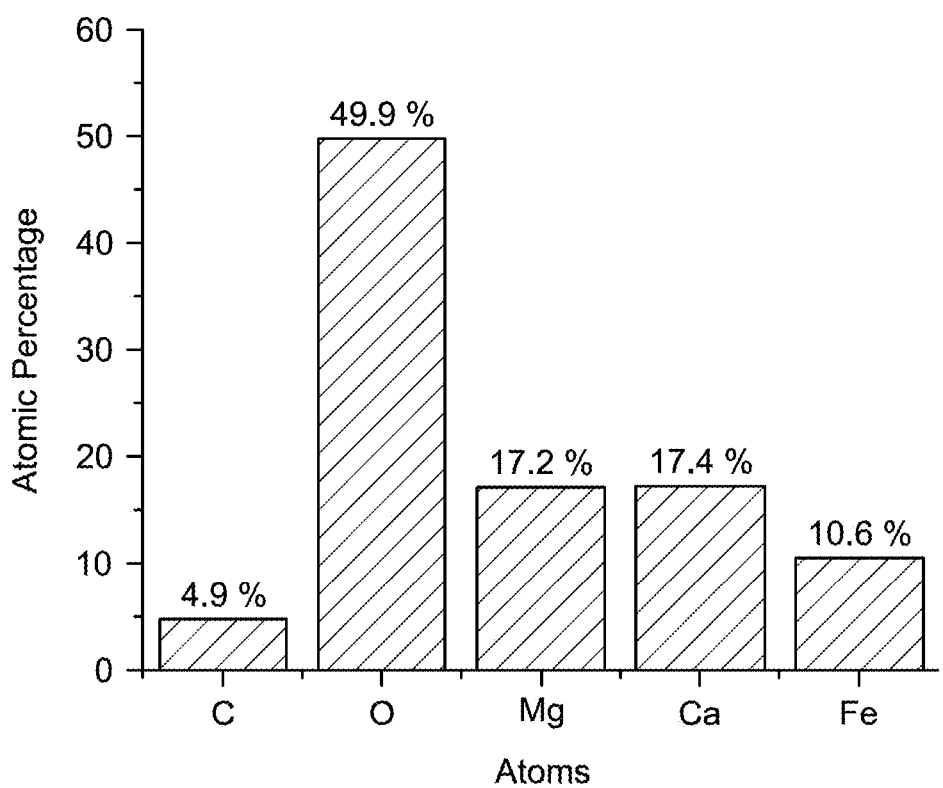
FIG. 3 is a bar graph showing a distribution of atomic percentages of elements in the $Ca_2Fe_2O_5/MgO/CaO/C$ nanocomposite, as determined by energy-dispersive X-ray (EDX) analysis, according to certain embodiments.

FIG. 3 illustrates the distribution of atomic percentages of elements in the synthesized nanocomposite as determined by energy-dispersive X-ray (EDX) analysis. The results reveal the presence of carbon (C), oxygen (O), magnesium (Mg), calcium (Ca), and iron (Fe) in the nanocomposite with atomic percentages of 4.9%, 49.9%, 17.2%, 17.4%, and 10.6%, respectively. The presence of carbon in the nanocomposite is attributed to the use of tartaric acid and polyethylene glycol 400 during the synthesis process, as these organic components act as complexing agents and polymeric precursors in the Pechini sol-gel method, leaving residual carbon after calcination. These findings confirm the successful incorporation of the expected elements and the role of the synthesis method in introducing carbon into the final nanocomposite structure.

Figure 4:
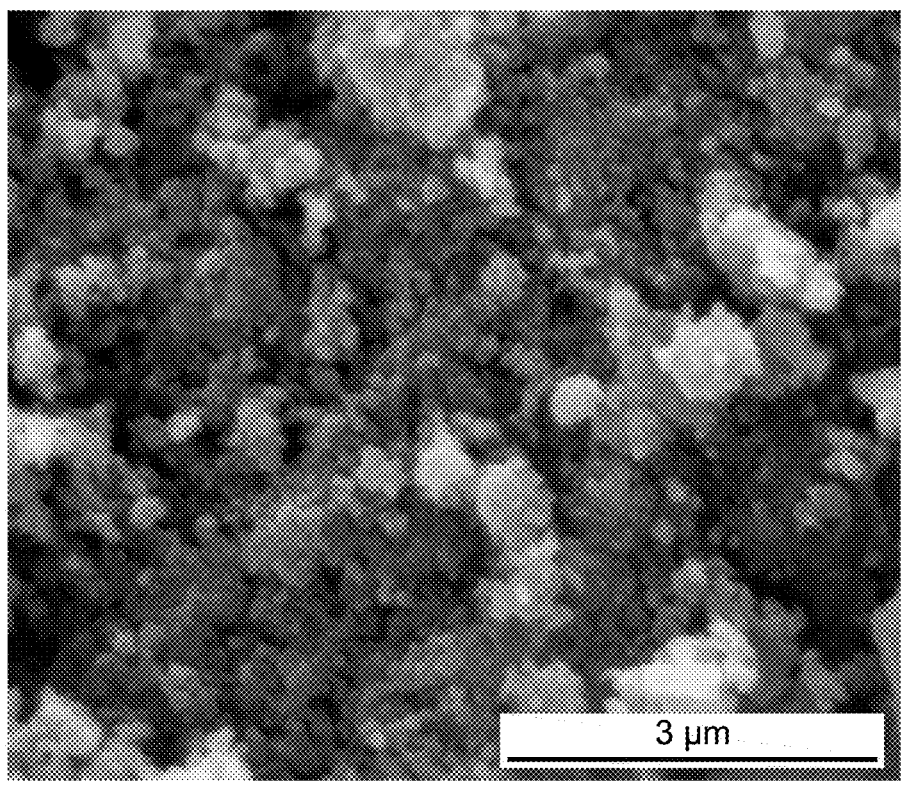
FIG. 4 is a scanning electron microscopy (SEM) image of the $Ca_2Fe_2O_5/MgO/CaO/C$ nanocomposite, according to certain embodiments.

FIG. 4 shows the scanning electron microscope (SEM) image of the synthesized nanocomposite, which demonstrates the morphological characteristics and microstructural arrangement of the material. The SEM image reveals a heterogeneous distribution of particles with a combination of irregularly shaped agglomerates and nearly spherical nanostructures. The spherical particles are indicative of the uniform nucleation during the synthesis process, while the agglomerated clusters suggest the presence of interconnected structures due to the calcination and drying steps in the Pechini sol-gel method. These morphological features highlight the successful synthesis of the nanocomposite and the preservation of nanoscale characteristics essential for its intended applications.

The synthesized $Ca_2Fe_2O_5$/MgO/CaO/C nanocomposite has applications in water purification systems due to its enhanced structural and adsorptive properties for removing heavy metals and pollutants. It can be utilized in catalysis for industrial chemical reactions, leveraging its nanoscale crystallinity, and phase composition to improve efficiency and selectivity. Additionally, the nanocomposite may find use in environmental remediation technologies, offering a cost-effective and sustainable solution for managing toxic contaminants in aquatic environments.

Numerous modifications and variations of the present disclosure are possible in light of the above teachings. It is therefore to be understood that within the scope of the appended claims, the invention may be practiced otherwise than as specifically described herein.

The invention claimed is:

1. A $Ca_2Fe_2O_5$/MgO/CaO/C nanocomposite, comprising:
   elemental carbon (C);
   an orthorhombic calcium iron oxide ($Ca_2Fe_2O_5$) crystalline phase;
   a cubic magnesium oxide (MgO) crystalline phase; and
   a cubic calcium oxide (CaO) crystalline phase,
   wherein the $Ca_2Fe_2O_5$/MgO/CaO/C nanocomposite has an atomic concentration of carbon (C), oxygen (O), magnesium (Mg), calcium (Ca) and iron (Fe) at a range of 1 to 5 atomic percent (at. %), 50 to 75 at. %, 10 to 35 at. %, 10 to 35 at. % and 5 to 15 at. %, respectively, based on the total number of atoms in the $Ca_2Fe_2O_5$/MgO/CaO/C nanocomposite.

2. The $Ca_2Fe_2O_5$/MgO/CaO/C nanocomposite of claim 1, having an atomic concentration of carbon (C), oxygen (O), magnesium (Mg), calcium (Ca) and iron (Fe) at a range of 2 to 5 atomic percent (at. %), 50 to 65 at. %, 10 to 25 at. %, 10 to 25 at. % and 8 to 15 at. %, respectively, based on the total number of atoms in the $Ca_2Fe_2O_5$/MgO/CaO/C nanocomposite.

3. The $Ca_2Fe_2O_5$/MgO/CaO/C nanocomposite of claim 1, having an average crystallite size of 50 to 75 nanometers (nm).

4. The $Ca_2Fe_2O_5$/MgO/CaO/C nanocomposite of claim 1, having an average crystallite size of 50 to 65 nm.

5. The $Ca_2Fe_2O_5$/MgO/CaO/C nanocomposite material of claim 1, having a plurality of irregularly shaped agglomerates.

6. The $Ca_2Fe_2O_5$/MgO/CaO/C nanocomposite material of claim 1, having a plurality of spherical nanostructures.

7. The $Ca_2Fe_2O_5$/MgO/CaO/C nanocomposite material of claim 1, having a plurality of interconnected structures.

8. A method for preparing the $Ca_2Fe_2O_5$/MgO/CaO/C nanocomposite of claim 1, comprising:
   forming an aqueous mixture by mixing a first aqueous solution of a chelating agent with a second aqueous solution comprising an iron salt, a magnesium salt, and a calcium salt;
   adding a glycol into the aqueous mixture to form a gel;
   heating the gel at a temperature of 150 to 300 degrees Celsius (° C.) to form a dry powder;
   calcining the dry powder at a temperature of 600 to 800° C. to form the $Ca_2Fe_2O_5$/MgO/CaO/C nanocomposite.

9. The method of claim 8, wherein the first aqueous solution is added into the second aqueous solution under continuous stirring for a period of 10 to 40 minutes.

10. The method of claim 8, wherein:
    the iron salt is selected from the group consisting of iron sulfate ($Fe_2(SO_4)_3$), iron nitrate ($Fe(NO_3)_3$), iron chloride ($FeCl_3$), and iron acetate ($Fe(CH_3COO)_3$), and the magnesium salt is selected from the group consisting of magnesium sulfate ($MgSO_4$), magnesium nitrate ($Mg(NO_3)_2$), magnesium chloride ($FeCl_2$), and magnesium acetate ($Mg(CH_3COO)_2$), and
    the calcium salt is selected from the group consisting of calcium sulfate ($CaSO_4$), calcium nitrate ($Ca(NO_3)_2$), calcium chloride ($CaCl_2$)), and calcium acetate ($Ca(CH_3COO)_2$).

11. The method of claim 8, wherein:
    the iron salt is iron nitrate ($Fe(NO_3)_3$), and
    the magnesium salt is magnesium nitrate ($Mg(NO_3)_2$), and
    the calcium salt is calcium nitrate ($Ca(NO_3)_2$).

12. The method of claim 8, wherein the chelating agent comprises at least one hydroxyalkyl carboxylic acid selected from the group consisting of citric acid, tartaric acid, malic acid, mandelic acid and 12-hydroxystearic acid.

13. The method of claim 8, wherein the chelating agent is tartaric acid.

14. The method of claim 8, wherein the glycol is introduced under continuous stirring into the aqueous mixture.

15. The method of claim 8, wherein the glycol has a number average molecular weight ($M_n$) of 200 to 5000 grams per mole (g/mol).

16. The method of claim 8, wherein the glycol is selected from the group consisting of polyethylene glycol 200, polyethylene glycol 400, polyethylene glycol 4000, polypropylene glycol 200, and mixtures thereof.

17. The method of claim 8, wherein the glycol is polyethylene glycol 400.

18. The method of claim 8, wherein the tartaric acid and the polyethylene glycol 400 decompose during calcination.

19. The method of claim 8, wherein the calcination of the tartaric acid yields a residue with the element carbon in the $Ca_2Fe_2O_5$/MgO/CaO/C nanocomposite material.

20. The method of claim 8, wherein the calcination of the polyethylene glycol 400 yields a residue with the element carbon in the $Ca_2Fe_2O_5$/MgO/CaO/C nanocomposite material.

* * * * *